US012658611B2

(12) United States Patent
Mamiya et al.

(10) Patent No.: US 12,658,611 B2
(45) Date of Patent: Jun. 16, 2026

(54) HERMETIC TERMINAL AND CONTACT DEVICE USING HERMETIC TERMINAL

(71) Applicant: Schott Japan Corporation, Shiga (JP)

(72) Inventors: Ko Mamiya, Koka (JP); Tetsushi Morikawa, Koka (JP)

(73) Assignee: SCHOTT JAPAN CORPORATION, Shiga (JP)

(*) Notice: Subject to any disclaimer, the term of this patent is extended or adjusted under 35 U.S.C. 154(b) by 945 days.

(21) Appl. No.: 17/906,391

(22) PCT Filed: Mar. 17, 2021

(86) PCT No.: PCT/JP2021/010825
§ 371 (c)(1),
(2) Date: Sep. 15, 2022

(87) PCT Pub. No.: WO2021/187527
PCT Pub. Date: Sep. 23, 2021

(65) Prior Publication Data

US 2023/0114048 A1 Apr. 13, 2023

(30) Foreign Application Priority Data

Mar. 18, 2020 (JP) ................................ 2020-047810
Mar. 11, 2021 (JP) ................................ 2021-038967

(51) Int. Cl.
*H01R 9/24* (2006.01)
*H01H 50/02* (2006.01)
*H01H 50/14* (2006.01)

(52) U.S. Cl.
CPC ............ *H01R 9/24* (2013.01); *H01H 50/023* (2013.01); *H01H 50/14* (2013.01)

(58) Field of Classification Search
CPC ........ H01R 9/24; H01H 50/023; H01H 50/14; H01H 1/2083; H01H 50/02; H01H 51/065
See application file for complete search history.

(56) References Cited

U.S. PATENT DOCUMENTS

2010/0060392 A1 3/2010 Cho et al.
2012/0092095 A1 4/2012 Lim
(Continued)

FOREIGN PATENT DOCUMENTS

EP 3358593 A1 8/2018
JP 2002242802 A 8/2002
(Continued)

OTHER PUBLICATIONS

[English Translation] International Preliminary Report on Patentability for International Patent Application No. PCT/JP2021/010825, dated Sep. 20, 2022, pp. all.
(Continued)

*Primary Examiner* — Travis S Chambers
(74) *Attorney, Agent, or Firm* — Dorsey & Whitney LLP

(57) ABSTRACT

A relay hermetic terminal characterized by including: a metal container having a through hole; a pipe lead inserted through the through hole; an insulating material sealing the metal container and the pipe lead; and a terminal block made of a low-resistance metal, penetrating the pipe lead and secured to the pipe lead. The terminal block includes at least a body portion and a head portion, further the head portion has a fixation portion, and an axis of the fixation portion is not arranged coaxially with an axis of the body portion, and a relay contact device using the same are provided.

24 Claims, 6 Drawing Sheets

(56) References Cited

U.S. PATENT DOCUMENTS

| | | | |
|---|---|---|---|
| 2015/0194284 A1 | 7/2015 | Uruma et al. | |
| 2016/0181038 A1 | 6/2016 | Shimizu et al. | |
| 2018/0151300 A1* | 5/2018 | Honda | H01G 9/008 |
| 2018/0286614 A1 | 10/2018 | Morikawa et al. | |
| 2019/0066951 A1 | 2/2019 | Kanematsu et al. | |
| 2019/0355536 A1 | 11/2019 | Ozaki et al. | |
| 2020/0014129 A1* | 1/2020 | Hamada | H01R 4/2495 |
| 2024/0222055 A1* | 7/2024 | Hartl | H01H 50/023 |

FOREIGN PATENT DOCUMENTS

| | | | |
|---|---|---|---|
| JP | 2010062140 A | 3/2010 | |
| JP | 2014017086 A | 1/2014 | |
| JP | 2015046377 A | 3/2015 | |
| JP | 2015049939 A | 3/2015 | |
| JP | 2015130260 A | 7/2015 | |
| JP | 2017069144 A | 4/2017 | |
| WO | WO-2015194169 A1 * | 12/2015 | H01H 51/065 |

OTHER PUBLICATIONS

[English Translation] Notice of Reasons for Refusal for Japanese Patent Application No. 2021-038967, mailed Oct. 13, 2022, pp. all.

[English Translation] Written Opinion for the International Patent Application No. PCT/JP2021/010825, dated Jun. 8, 2021, pp. all.

Extended European Search Report mailed Jan. 17, 2024 in EP Application No. 21772050.7; pp. all.

International Search Report and Written Opinion (English Translation on ISR only) mailed on Jun. 8, 2021 for International Patent Application No. PCT/JP2021/010825, pp. all.

* cited by examiner

HERMETIC TERMINAL AND CONTACT DEVICE USING HERMETIC TERMINAL

CROSS REFERENCE TO RELATED APPLICATION(S)

This application is a U.S. National Stage filing under 35 U.S.C. § 371 of PCT Application No. PCT/JP2021/010825, filed Mar. 17, 2021, which claims priority to Japanese Application No. 2020-047810, filed Mar. 18, 2020 and Japanese Application No. 2021-038967, filed Mar. 11, 2021, which are incorporated herein by reference, in their entirety, for any purpose.

TECHNICAL FIELD

The present invention relates to any kind of hermetic terminal including a hermetic terminal mounted to a relay device with a high electric capacity and any kind of relay device having a hermetic terminal and including a relay contact device using the hermetic terminal.

BACKGROUND ART

As measures against environmental problems such as global warming, foreign and domestic automobile manufacturers have put hybrid vehicles (hereinafter abbreviated as HEV) into practical use, which have now also been diversified into large-sized vehicles, RV vehicles, and the like. Furthermore, development of electric vehicles (hereinafter abbreviated as EV) is also becoming active. HEVs and EVs require high motor outputs and are provided with high-capacity batteries. Thus, in order to drive HEVs and EVs stably and efficiently, a high-capacity relay with high performance is essential. A high-capacity relay for automotive application is installed in a limited space, and thus is required to have a reduced size and weight. In addition, it is necessary to suppress temperature rise during continuous energization as much as possible even while using a low-resistance metal in an energized portion in order to improve the energization performance of the relay. Furthermore, because of a vehicle-mounted component, robustness and reliability to withstand severe vibrations and temperature load are also required.

An example of such a relay is an electromagnetic relay described in Patent Literature 1. The electromagnetic relay includes: an electromagnet device that includes a first excitation coil, a movable element and a first stator, attracts the movable element to the first stator by a magnetic flux generated when the first excitation coil is energized, and moves the movable element from a second position to a first position; a contact device that includes a fixed contact and a movable contact and in which the movable contact moves with the movement of the movable element so that the contact device is put in a closed state in which the movable contact is in contact with the fixed contact when the movable element is at the first position, and an open state in which the movable contact is separated from the fixed contact when the movable element is at the second position and a third position; and a trip device that includes a second excitation coil connected in series with the contact device and moves the movable element to the third position by a magnetic flux generated by the second excitation coil when an abnormal current of not less than a prescribed value flows through the contact device in a state in which the movable element is at the first position, and the contact device, the electromagnet device and the trip device are aligned in one direction, and the trip device is arranged on the side opposite to the contact device with respect to the electromagnet device.

As such a contact device forming a relay with high electric capacity for automotive application, a contact device has conventionally been used in which a space in which a fixed contact and a movable contact are arranged is formed and the space is filled with arc-extinguishing gas (insulating gas) in order to quickly extinguish an arc generated when the contact is turned off. For example, in a contact device described in Patent Literature 2, a housing, a coupling body, a plate and a plunger cap are joined to form a space accommodating a fixed contact and a movable contact. That is, in the contact device, a space surrounded by the housing, the coupling body, the plate, and the plunger cap is provided, and this space is hermetically filled with arc-extinguishing gas containing hydrogen as a main component.

A contact device as described in Patent Literature 3 is housed in a metal container having a hermetic terminal, and the contact device is an electromagnetic relay for opening and closing the contact device with an electromagnet device, and is composed of a metal container having a through hole, a pipe lead inserted through the through hole, insulating glass sealing the metal container and the pipe lead, a terminal block made of a low-resistance metal, penetrating the pipe lead and secured to the pipe lead, a fixed contact supported on the terminal block, a lid covering and airtightly sealing the periphery of an opening of the metal container, a movable contactor supported on a shaft penetrating the lid, and a movable contact provided to the movable contactor. The hermetic terminal included in this contact device includes a metal container having a through hole, a pipe lead inserted through the through hole, an insulating glass sealing the metal container and the pipe lead, and a terminal block made of a low-resistance metal, penetrating the pipe lead and secured to the pipe lead.

DOCUMENT LIST

Patent Literatures

Patent Literature 1: Japanese Patent Application Publication No. 2015-046377

Patent Literature 2: Japanese Patent Application Publication No. 2015-049939

Patent Literature 3: Japanese Patent Application Publication No. 2017-069144

Patent Literature 4: Japanese Patent Application Publication No. 2014-017086

SUMMARY OF INVENTION

Technical Problem

In a terminal block of a conventional contact device, as shown by a terminal block (fixed terminal 33) in Patent Literature 4, a spiral hole for electrical connection to an external device is provided to an outer-end head portion of the terminal block coaxially with the axial direction of this terminal. Although electrical connection is made by fastening an external wiring into the spiral hole with a bolt, the spiral hole is arranged coaxially with a sealing hole in insulating glass of a hermetic terminal, rotational torque of the spiral fastener is directly applied to the glass sealing portion in this configuration, and thus the insulating glass may be damaged at the time of fastening and electrically connecting the external device to the terminal block.

An object of the present invention is proposed for resolving the above-mentioned problem, and is to realize a hermetic terminal that realizes a contact device with higher hermeticity in a contact device used for a relay with high electric capacity (an electromagnetic relay with high electric capacity) and a relay contact device to which the hermetic terminal is applied, as well as to improve the robustness of an insulating material due to the conventional configuration. At the same time, a problem on hermeticity reliability can also be resolved.

Solution to Problem

According to the present invention, there is provided a relay hermetic terminal characterized by including: a metal container having a through hole; a pipe lead inserted through the through hole; an insulating material sealing the metal container and the pipe lead; and a terminal block made of a low-resistance metal, penetrating the pipe lead and secured to the pipe lead, wherein the terminal block includes at least a body portion and a head portion, further the head portion has a fixation portion, and an axis of the fixation portion is not arranged coaxially with an axis of the body portion. For example, regarding the fixation portion mentioned above, at least part of an outer portion of the stick-shaped body portion of the terminal block (a portion of the terminal block arranged outside the metal container) is formed as the head portion, and a through hole, a blind hole, a protrusion or the like is provided to a side surface of the axis of the head portion to form the fixation portion. Alternatively, at least part of an outer portion of the stick-shaped body portion of the terminal block (a portion of the terminal block arranged outside the metal container) is extended to form the head portion, and a through hole, a blind hole, a protrusion or the like is provided on its side surface to form the fixation portion. Thus, since the fixation portion is not arranged coaxially with the axis of the stick-shaped body portion, the axial direction of the terminal block and the rotation axis of spiral fastening of the terminal block are arranged at different positions or in different directions, and when the hermetic terminal and an external device are fixed to each other, stress such as rotational torque of spiral fastening is not applied on the insulating material.

Further, according to the present invention, there is provided a relay contact device using the relay hermetic terminal as a contact device in an electromagnetic relay for opening and closing the contact device with an electromagnet device. That is, there is provided a relay contact device in an electromagnetic relay for opening and closing the contact device with an electromagnet device, the contact device being characterized by including: a metal container having a through hole; a pipe lead inserted through the through hole; an insulating material sealing the metal container and the pipe lead; a terminal block made of a low-resistance metal, penetrating the pipe lead and secured to the pipe lead; a fixed contact supported on the terminal block; a lid covering and airtightly sealing a periphery of an opening of the metal container; a movable contactor supported on a shaft penetrating the lid; and a movable contact provided to the movable contactor, wherein the terminal block includes at least a body portion and a head portion, further the head portion has a fixation portion, and an axis of the fixation portion is not arranged coaxially with an axis of the body portion. For example, regarding the fixation portion mentioned above, at least part of an outer portion of the stick-shaped body portion of the terminal block (a portion of the terminal block arranged outside the metal container) is formed as the head portion, and a through hole, a blind hole, a protrusion or the like is provided to a side surface of the axis of the head portion to form the fixation portion. Alternatively, at least part of an outer portion of the stick-shaped body portion of the terminal block (a portion of the terminal block arranged outside the metal container) is extended to form the head portion, and a through hole, a blind hole, a protrusion or the like is provided on its side surface to form the fixation portion. Thus, since the fixation portion is not arranged coaxially with the axis of the stick-shaped body portion, the axial direction of the terminal block and the rotation axis of spiral fastening of the terminal block are arranged at different positions or in different directions, and when the contact device and an external device are fixed to each other, stress such as rotational torque of spiral fastening is not applied on the insulating material.

The fixation portion according to the present invention may use any shape and fixation means as long as the hermetic terminal and the contact device can be fixed to an electrode terminal portion of the external device. For example, it may be formed by one or more of a through hole, a blind hole, a spiral hole or a spiral blind hole for spiral fastening, a notch, a protrusion, a convex portion, or the like.

Effects of Invention

According to an embodiment of the present invention, it is possible to improve the robustness of a hermetic terminal and a contact device.

DESCRIPTION OF EMBODIMENTS

Figure 1A:
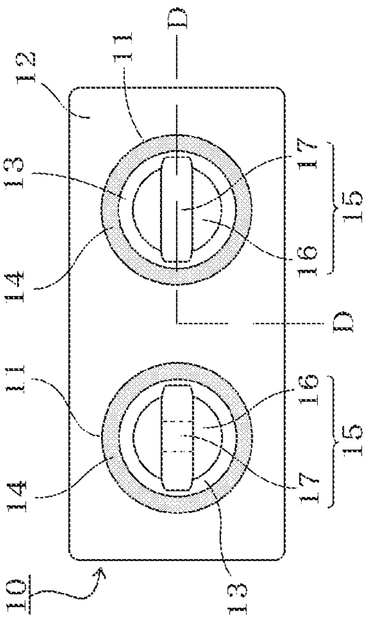
FIG. 1A shows a relay hermetic terminal 10 according to the present invention, and shows a plan view of a terminal block 15.
Figure 1B:
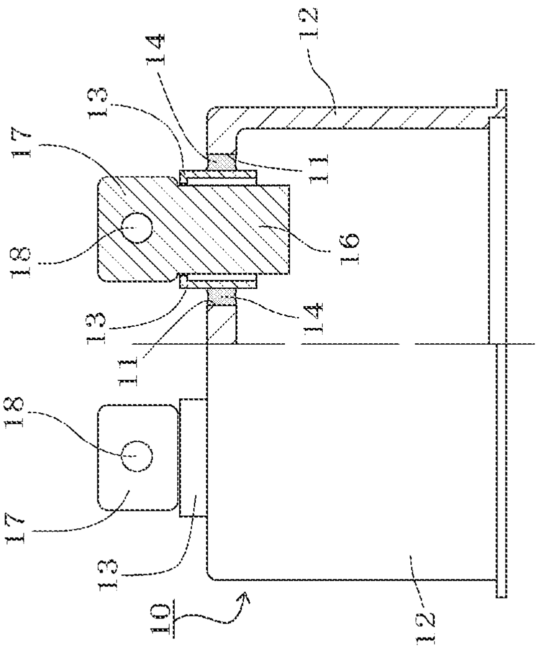
FIG. 1B shows a relay hermetic terminal 10 according to the present invention and shows a front view and a partial sectional view taken along line D-D in FIG. 1A of a terminal block 15.
Figure 1C:
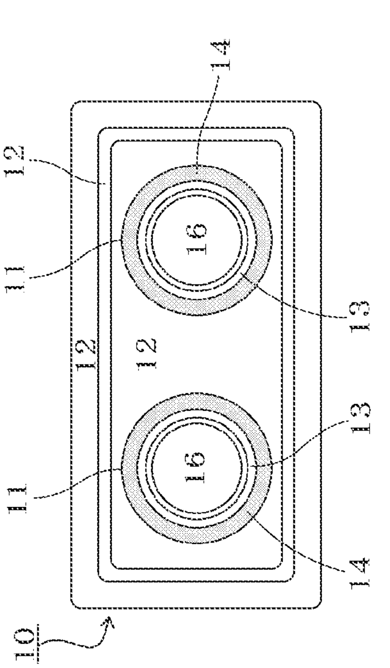
FIG. 1C shows a relay hermetic terminal 10 according to the present invention and shows a bottom view of a terminal block 15.
Figure 1D:
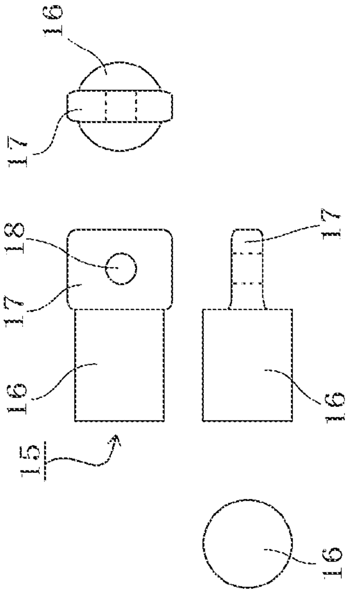
FIG. 1D shows a relay hermetic terminal 10 according to the present invention and shows projected views of a terminal block 15.
Figures 2A, 2B, 2C, 2D:
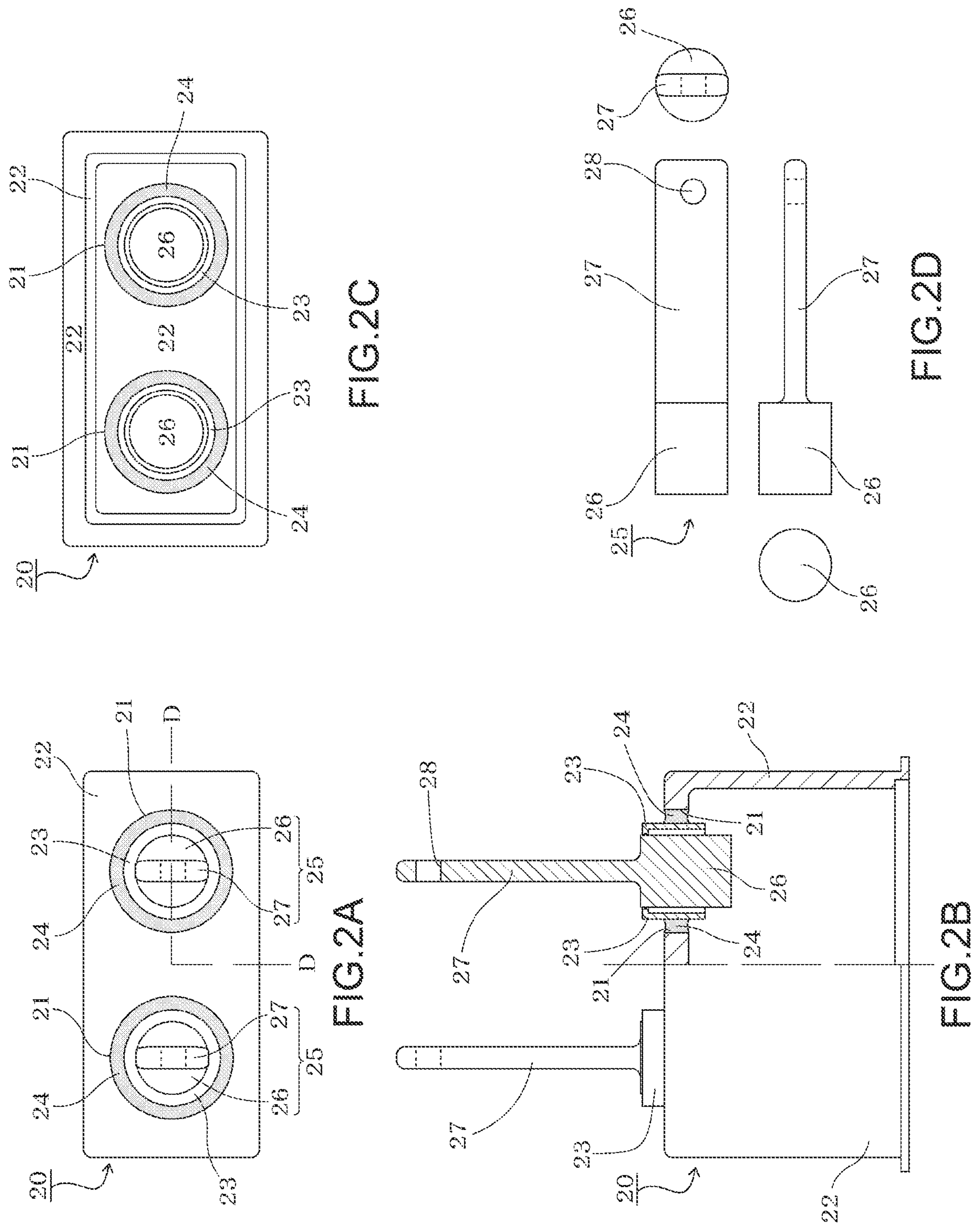
FIG. 2A shows a relay hermetic terminal 20 according to the present invention and shows a plan view of a terminal block 25.
FIG. 2B shows a relay hermetic terminal 20 according to the present invention and shows a front view and a partial sectional view taken along line D-D in FIG. 2A of a terminal block 25.
FIG. 2C shows a relay hermetic terminal 20 according to the present invention and shows a bottom view of a terminal block 25.
FIG. 2D shows a relay hermetic terminal 20 according to the present invention and shows projected views of a terminal block 25.

Hereinafter, a relay hermetic terminal of the present invention and a relay contact device using the hermetic terminal will be described with reference to the drawings.

As shown in FIGS. 1A to 1D, a relay hermetic terminal 10 according to the present invention is characterized by including a metal container 12 made of iron or an iron-based alloy and having a through hole 11, a pipe lead 13 made of iron or an iron-based alloy and inserted through the through hole 11, an insulating material 14 made of glass or epoxy resin and sealing the metal container 12 and the pipe lead 13, and a terminal block 15 made of a low-resistance metal such as copper, aluminum or a copper-based alloy or an aluminum-based alloy, penetrating the pipe lead 13 and secured to the pipe lead 13, wherein the terminal block 15 includes at least a body portion 16 and a head portion 17, further the head portion 17 has a fixation portion 18, and the center axis of the fixation portion 18 is not arranged coaxially with the center axis of the body portion 16. The fixation portion 18 is provided to an outer side surface of the head portion 17 of the terminal block 15 (a side surface portion of the terminal block 15 arranged outside the metal container 12) so as to be orthogonal to the axis of the body portion 16, and the terminal block 15 is attached to the pipe lead 13. When an external device is fixed to the hermetic terminal 10, the external device can be fastened by the fixation portion 18. Since the fixation portion 18 is attached such that the center axis of the body portion 16 and the center axis of the fixation portion 18 are orthogonal to each other, stress such as rotational torque of spiral fastening, for example, is not applied to the insulating material 14 when the hermetic terminal 10 and the external device are fixed to each other.

Although in the example of FIGS. 1A to 1D, the inner diameter center axis of the fixation portion 18 is orthogonal to the axis of the stick-shaped body portion 16, it is sufficient if the axis of the fixation portion 18 is at least not arranged coaxially with the center of the axis of the stick-shaped body portion 16. If the fixation portion 18 is in the form of a hole, it is sufficient that the center axis of its diameter is not arranged coaxially with the center axis of the body portion 16. If the fixation portion 18 is in the form of a protrusion or a convex, it is sufficient that the center axis of the protrusion is not arranged coaxially with the center axis of the body portion 16. Therefore, the fixation portion 18 according to the present invention may be in any form as long as the center of an axis forming the fixation portion 18 is arranged at a different position than the axis of the body portion 16 or the axes are arranged in different directions.

Figure 6:
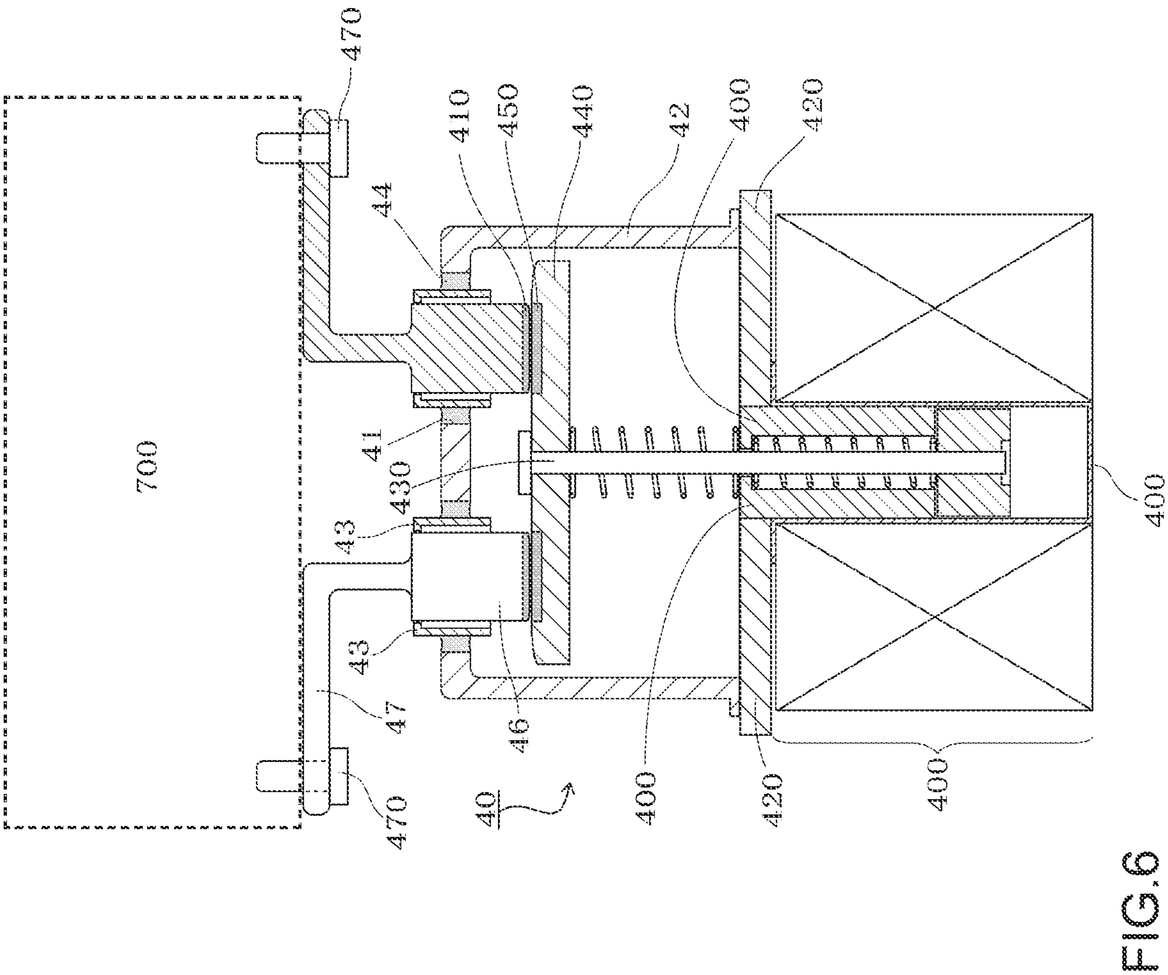
FIG. 6 is a front sectional view showing an example of connecting the relay contact device 40 according to the present invention.

For example, a relay hermetic terminal 20 according to the present invention shown in FIGS. 2A to 2D is characterized by including a metal container 22 made of iron or an iron-based alloy and having a through hole 21, a pipe lead 23 made of iron or an iron-based alloy and inserted through the through hole 21, an insulating material 24 made of glass or epoxy resin and sealing the metal container 22 and the pipe lead 23, and a terminal block 25 made of a low-resistance metal such as copper, aluminum or a copper-based alloy or an aluminum-based alloy, penetrating the pipe lead 23 and secured to the pipe lead 23, wherein the terminal block 25 includes at least a body portion 26 and a head portion 27, further the head portion 27 has a fixation portion 28, and the center axis of the fixation portion 28 is not arranged coaxially with the center axis of the body portion 26. The fixation portion 28 is provided on a side surface of the head portion 27 provided by extending an outer side portion of the body portion 26 of the terminal block 25 (a portion of the terminal block 25 arranged outside the metal container 22), and further, the terminal block 25 is attached to the pipe lead 23. When the hermetic terminal 20 and an external device are fixed to each other, the extended head portion 27 can be bent in a predetermined shape for attachment, and is fixable to an external device 700 at a position distanced from the axis of the body portion 26 as shown in FIG. 6 by using the fixation portion 28 provided on the side surface of the head portion 27. In this manner, stress such as rotational torque of spiral fastening, for example, is not applied to the insulating material 24.

Figures 3A, 3B:
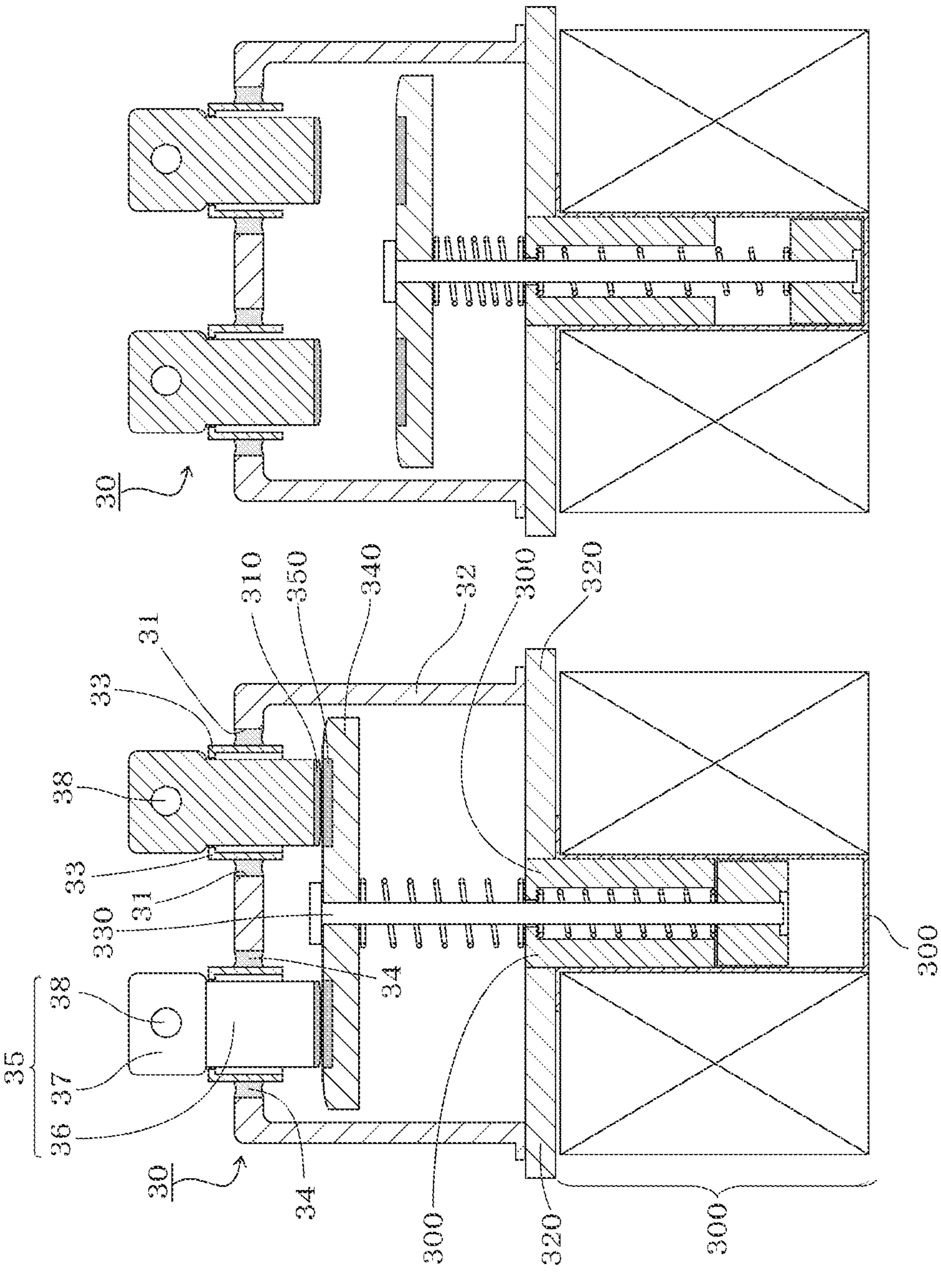
FIG. 3A shows a relay contact device 30 according to the invention and is a front view in a closed state and shows a sectional view except for the portion of a left-side terminal block 35.
FIG. 3B shows a relay contact device 30 according to the invention and shows a front sectional view in an open state.
Figure 4:
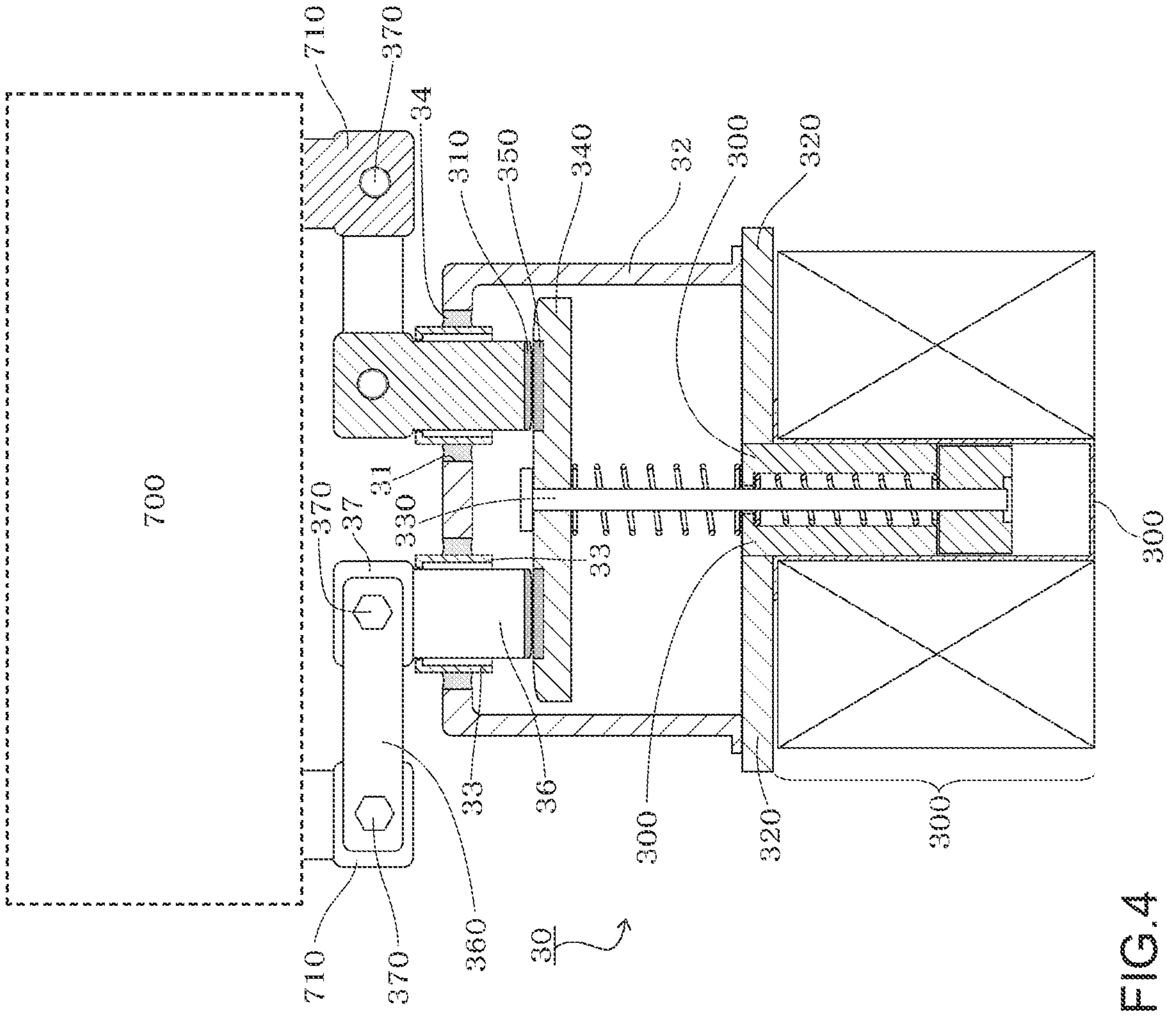
FIG. 4 is a front sectional view showing an example of connecting the relay contact device 30 according to the present invention.

As shown in FIGS. 3A and 3B, a relay contact device 30 according to the present invention is a relay contact device using the relay hermetic terminal 10 described above, and is characterized by including, in an electromagnetic relay for opening and closing the contact device with an electromagnet device 300, at least a metal container 32 made of iron or an iron-based alloy and provided with a through hole 31, a pipe lead 33 made of iron or an iron-based alloy and inserted through the through hole 31, an insulating material 34 made of glass or epoxy resin and sealing the pipe lead 33 and the metal container 32, a terminal block 35 made of a low-resistance metal such as copper, aluminum or a copper-based alloy or an aluminum-based alloy, penetrating the pipe lead 33 and secured to the pipe lead 33, a fixed contact 310 supported on the terminal block 35, a lid 320 made of iron or an iron-based alloy and covering and airtightly sealing the periphery of an opening of the metal container 32, a movable contactor 340 supported on a shaft 330 penetrating the lid 320, and a movable contact 350 provided to the movable contactor 340, wherein the terminal block 35 includes at least a body portion 36 and a head portion 37, further the head portion 37 has a fixation portion 38 on its side surface, and the center axis of the fixation portion 38 is not arranged coaxially with the center axis of the body portion 36. The fixation portion 38 is provided to an outer side surface of the head portion 37 of the terminal block 35 (a side surface portion of the terminal block 35 arranged outside the metal container 32) so as to be orthogonal to the axis of the body portion 36, and the terminal block 35 is attached to the pipe lead 33. As shown in FIG. 4, the arrangement is made such that, when an external device 700 is fixed to the contact device 30, fixation to the external device 700 can be made by using a bus bar 360 at the fixation portion 38. In this manner, the attachment is made such that the center axis of the body portion 36 and the center axis of the fixation portion 38 are orthogonal to each other, and thus the axial direction of the terminal block 35 and the fixation axis of the terminal block 35 are arranged in different directions. In this manner, stress such as rotational torque of spiral fastening, for example, is not applied to the insulating material 34 when the contact device 30 and the external device 700 are fixed to each other.

Figure 5A:
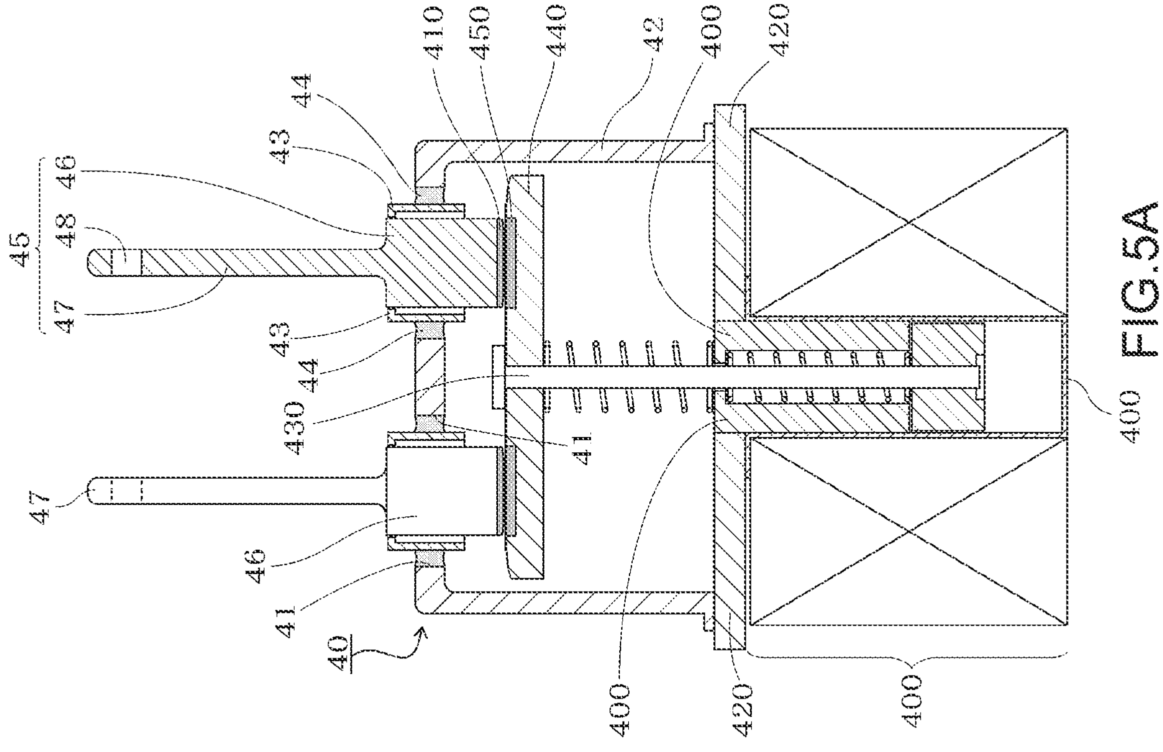
FIG. 5A shows a relay contact device 40 according to the present invention and is a front view in a closed state and shows a sectional view except for the portion of a left-side terminal block 35.
Figure 5B:
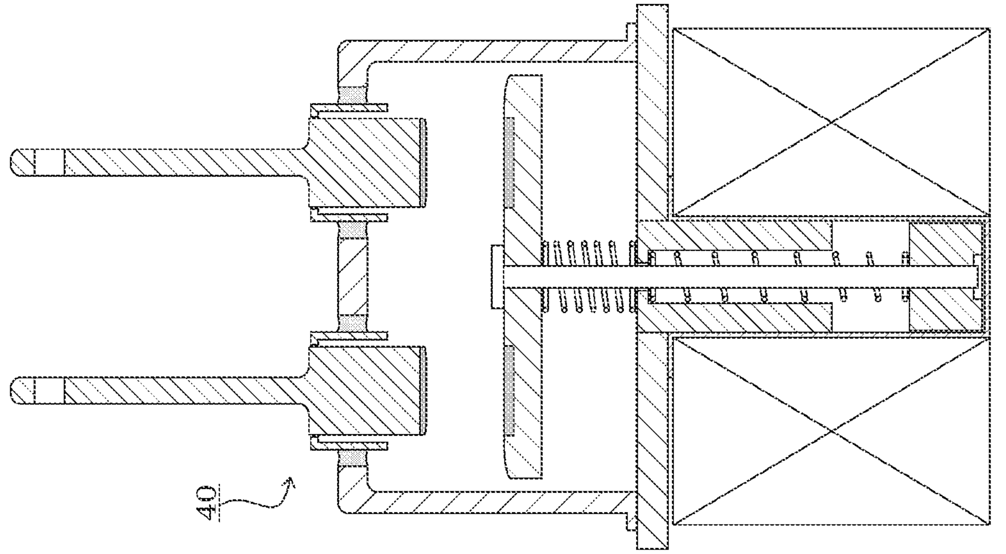
FIG. 5B shows a relay contact device 40 according to the present invention and shows a front sectional view in an open state.

As shown in FIGS. 5A and 5B, a relay contact device 40 according to the present invention is a relay contact device using the relay hermetic terminal 20 described above. That is, it is characterized by including, in an electromagnetic relay for opening and closing the contact device with an electromagnet device 400, at least a metal container 42 made of iron or an iron alloy and provided with a through hole 41, a pipe lead 43 made of iron or an iron-based alloy and inserted through the through hole 41, an insulating material 44 made of glass or epoxy resin and sealing the pipe lead 43 and the metal container 42, a terminal block 45 made of a low-resistance metal such as copper, aluminum or a copper-based alloy or an aluminum-based alloy, penetrating the pipe lead 43 and secured to the pipe lead 43, a fixed contact 410 supported on the terminal block 45, a lid 420 made of iron or an iron-based alloy and covering and airtightly sealing the periphery of an opening of the metal container 42, a movable contactor 440 supported on a shaft 430 penetrating the lid 420, and a movable contact 450 provided to the movable contactor 440, wherein the terminal block 45 includes at least a body portion 46 and a head portion 47, further the head portion 47 has a fixation portion 48 on its side surface, and the center axis of the fixation portion 48 is not arranged coaxially with the center axis of the body portion 46. The fixation portion 48 is provided to the head portion 47 provided by extending an outer side portion of the body portion 46 of the terminal block 45 (a portion of the terminal block 45 arranged outside the metal container 42). The terminal block 45 is attached to the pipe lead 43. The head portion 47 can be bent at a predetermined angle as shown in FIG. 6, and the fixation portion 48 is provided at a position close to its outer end portion. The arrangement is made such that, when the contact device 40 and an external device 700 are fixed to each other, fixation to the external device 700 can be made at a position distanced from the axis of the body portion 46 by using the fixation portion 48. In this manner, stress such as rotational torque of spiral fastening, for example, is not applied to the insulating material 44 when the external device 700 is fixed to the contact device 40.

The fixation portion according to the present invention may use any shape and fixation means as long as the hermetic terminal and the contact device can be fixed to an electrode terminal portion of the external device. For example, it may be formed by one or more of a through hole, a blind hole, a spiral hole or a spiral blind hole for spiral fastening, a notch, a protrusion, a convex portion, or the like.

In the relay contact device according to the present invention, a heat-resistant insulating material or a lining of a heat-resistant insulating material may be further attached to or provided on the inner wall surface of the metal container and the lid as necessary for the purpose of enhancing the heat resistance and the insulation property.

EXAMPLES

As shown in FIGS. 1A to 1D, a relay hermetic terminal 10 of Example 1 according to the present invention is characterized by including a metal container 12 made of iron and having a through hole 11, a pipe lead 13 made of an Fe—Ni alloy and inserted through the through hole 11, an insulating material 14 of soda barium glass hermetically sealing the metal container 12 and the pipe lead 13, and a terminal block 15 made of a copper alloy, penetrating the pipe lead 13 and hermetically secured to the pipe lead 13, wherein the terminal block 15 includes a columnar body portion 16 and a flat plate-shaped head portion 17, and further has a fixation portion 18 consisting of a through hole in the head portion 17, and the inner diameter center axis of the fixation portion 18 is not arranged coaxially with the outer diameter center axis of the body portion 16. The through hole forming the fixation portion 18 is provided to the outer side surface of the head portion 17 of the terminal block 15 so as to be orthogonal to the axis of the stick-shaped body portion 16, and the terminal block 15 is hermetically attached by using a wax material in the state of being inserted through the pipe lead 13 having a shape in which a through hole is provided in a cylindrical bottom portion. The arrangement is made such that, when the hermetic terminal 10 and an external device are fixed to each other, fastening to the external device can be made by using the through hole. In this manner, since the center axis of the stick-shaped body portion 16 and the center axis of the through hole are arranged to be orthogonal to each other in the fixation portion 18, the axial direction of the terminal block 15 and the rotation axis of spiral fastening of the terminal block 15 are arranged in different directions, and rotational torque of spiral fastening is not applied to the insulating material 14 when the hermetic terminal 10 and the external device are fixed to each other. The flat plate-shaped head portion 27 has an advantage that the contact resistance of electrical connection can be reduced.

As shown in FIGS. 2A to 2D, a relay hermetic terminal 20 of Example 2 according to the present invention is characterized by including a metal container 22 made of stainless steel and having a through hole 21, a pipe lead 23 made of an Fe—Ni alloy and inserted through the through hole 21, an insulating material 24 of soda barium glass hermetically sealing the metal container 22 and the pipe lead 23, and a terminal block 25 made of copper, penetrating the pipe lead 23 and hermetically secured to the pipe lead 23, wherein the terminal block 25 includes a columnar body portion 26 and a head portion 27 provided to extend in a flat plate-shape, and further has a fixation portion 28 consisting of a through hole in the head portion 27, and the fixation portion 28 is not arranged coaxially with the axis of the stick-shaped body portion 26. The through hole forming the fixation portion 28 is provided by penetrating the head portion 27 provided in a flat plate-shape by extending an outer side portion of the stick-shaped body portion 26 of the terminal block 25, and the terminal block 25 is hermetically attached by using a wax material in the state of being inserted through the pipe lead 23 having a shape in which a through hole is provided in a cylindrical bottom portion. The outer-side head portion 27 extended in a plate shape can be bent at a predetermined angle, and the fixation portion 28 is provided on a side surface close to its outer end portion. The arrangement is made such that, when the hermetic terminal 20 and the external device are fixed to each other, fastening to an external device 700 can be made at a position distanced from the axis of the stick-shaped body portion 26 by using the fixation portion 28, and rotational torque of spiral fastening is not applied to the insulating material 24. The extended, flat plate-shaped head portion 37 has an effect of making it easy to perform bending processing in a predetermined direction and preventing bending in a direction other than the predetermined direction, besides reducing the contact resistance of electrical connection. In addition, the bus bar can be eliminated, which contributes to reduction in the number of components and the number of assembly steps.

As shown in FIGS. 3A and 3B, a relay contact device 30 of Example 3 according to the present invention is characterized by including, in an electromagnetic relay for opening and closing the contact device with an electromagnet device 300, a metal container 32 made of stainless steel and provided with a through hole 31, a pipe lead 33 made of an Fe—Ni alloy and inserted through the through hole 31, an insulating material 34 of soda barium glass hermetically sealing the pipe lead 33 and the metal container 32, a terminal block 35 made of a copper alloy, penetrating the pipe lead 33 and hermetically secured to the pipe lead 33, a fixed contact 310 supported on the terminal block 35, a lid 320 made of an Fe—Ni alloy and covering and airtightly sealing the periphery of an opening of the metal container 32, a movable contactor 340 supported on a shaft 330 penetrating the lid 320 and attached such that spring force by a spring can be exerted, and a movable contact 350 provided to the movable contactor 340, wherein the terminal block 35 includes a columnar body portion 36 and a flat plate-shaped head portion 37, and further has a fixation portion 38 consisting of a through hole in the head portion 37, and the inner diameter center axis of the fixation portion 38 is not arranged coaxially with the outer diameter center axis of the body portion 36. The through hole forming the fixation portion 38 is provided to the outer side surface of the head portion 37 of the terminal block 35 so as to be orthogonal to the axis of the stick-shaped body portion 36, and the terminal block 35 is hermetically attached by using a wax material to the pipe lead 33 having a shape in which a through hole is provided in a cylindrical bottom portion. As shown in FIG. 4, the arrangement is made such that, when an external device 700 is fixed to the contact device 30, fastening to an electrode portion 710 of the external device 700 can be made by a spiral 370 via a bus bar 360 fixed by being fastened to the fixation portion 38 by the spiral 370. In this manner, the attachment is made such that the center axis of the body portion 36 and the center axis of the fixation portion 38 are orthogonal to each other, and thus the axial direction of the terminal block 35 and the rotation axis of spiral fastening of the terminal block 35 are arranged in different directions. In this manner, rotational torque of spiral fastening is not applied to the insulating material 34.

As shown in FIGS. 5A and 5B, a relay contact device 40 of Example 4 according to the present invention is characterized by including, in an electromagnetic relay for opening and closing the contact device with an electromagnet device 400, a metal container 42 made of iron and provided with a through hole 41, a pipe lead 43 made of an Fe—Ni alloy and inserted through the through hole 41, an insulating material 44 of soda barium glass hermetically sealing the pipe lead 43 and the metal container 42, a terminal block 45 made of copper, penetrating the pipe lead 43 and hermetically secured to the pipe lead 43, a fixed contact 410 supported on the terminal block 45, a lid 420 made of an Fe—Ni alloy and covering and airtightly sealing the periphery of an opening of the metal container 42, a movable contactor 440 supported on a shaft 430 penetrating the lid 420 and attached such that spring force by a spring can be exerted, and a movable contact 450 provided to the movable contactor 440, wherein the terminal block 45 includes a columnar body portion 46 and a flat plate-shaped head portion 47, and further has a fixation portion 48 consisting of a through hole in the head portion 47, and the fixation portion 48 is not arranged coaxially with the axis of the stick-shaped body portion 46. The through hole forming the fixation portion 48 is provided by penetrating the plate-shaped head portion 47 provided by extending an outer side portion of the stick-shaped body portion 46 of the terminal block 45 in a plate shape, and the terminal block 45 is hermetically attached by using a wax material to the pipe lead 43 having a shape in which a through hole is provided in a cylindrical bottom portion. The outer-side head portion 47 extended in a plate shape can be bent at a predetermined angle, and the fixation portion 48 is provided on a side surface close to its outer end portion. As shown in FIG. 6, when the contact device 40 and an external device 700 are fixed to each other, by bending the head portion 47, the fixation portion 38 and an electrode portion 710 of the external device 700 can be fixed to each other by directly fastening them by a spiral 470 even without a bus bar. Since the fixation portion 48 is arranged such that it can be fixed to the external device 700 at a position distanced from the axis of the stick-shaped body portion 46, rotational torque of spiral fastening is not applied to the insulating material 44.

The fixation portion in each of the above-described examples can be modified such that it can be connected to the external device 700 by using a protrusion provided on the side surface of the head portion, instead of a through hole.

INDUSTRIAL APPLICABILITY

The present invention can be applied to any kind of hermetic terminal including a hermetic terminal mounted to a system main relay device for automotive application on an HEV, an EV or the like and any kind of relay device including a system main relay mounted to an HEV, an EV or the like.

LIST OF REFERENCE SIGNS

10 hermetic terminal,
11 through hole,
12 metal container,
13 pipe lead,
14 insulating material,
15 terminal block,
16 body portion,
17 head portion,
18 fixation portion,
20 hermetic terminal,
21 through hole,
22 metal container,
23 pipe lead,
24 insulating material,
25 terminal block,
26 body portion,
27 head portion,
28 fixation portion,
30 contact device,
31 through hole,
32 metal container,
33 pipe lead,
34 insulating material,
35 terminal block,
36 body portion,
37 head portion,
38 fixation portion,
300 electromagnet device,
310 fixed contact,
320 lid,
330 shaft,
340 movable contactor,
350 movable contact,
360 bus bar,
370 spiral,
40 contact device,
41 through hole,
42 metal container,
43 pipe lead,
44 insulating material,
45 terminal block, 46 body portion,
47 head portion,
48 fixation portion,
400 electromagnet device,
410 fixed contact,
420 lid,
430 shaft,
440 movable contactor,
450 movable contact,
470 spiral,
700 external device,
710 electrode portion.

The invention claimed is:

1. A hermetic terminal comprising:
- a metal container having a through hole;
- a pipe lead inserted through the through hole;
- an insulating material sealing the metal container and the pipe lead; and
- a terminal block made of a low-resistance metal, penetrating the pipe lead and secured to the pipe lead,
- wherein the terminal block comprises at least a body portion and a head portion, the head portion further has a fixation portion, the fixation portion comprises a through hole for spiral fastening, and an axis of the fixation portion is not arranged coaxially with an axis of the body portion.

2. The hermetic terminal according to claim 1, wherein the terminal block is made of a low-resistance metal.

3. The hermetic terminal according to claim 1, wherein the terminal block is made of copper, aluminum or a copper-based alloy or an aluminum-based alloy.

4. The hermetic terminal according to claim 1, wherein the insulating material is made of glass or epoxy resin.

5. The hermetic terminal according to any one of claim 1, wherein the head portion is provided on an outer side of the terminal block.

6. The hermetic terminal according to any one of claim 1, wherein the head portion is provided by extending the terminal block.

7. The hermetic terminal according to any one of claim 1, wherein the head portion is provided in a flat plate-shape.

8. The hermetic terminal according to any one of claim 1, characterized in that the head portion is bent at a predetermined angle.

9. The hermetic terminal according to any one of claim 1, wherein the fixation portion is formed by one or more of a through hole, a blind hole, a spiral hole or a spiral blind hole, a notch, a protrusion, and a convex portion.

10. The hermetic terminal according to any one of claim 1, wherein a center axis of the fixation portion is provided to be orthogonal to a center axis of the body portion.

11. The hermetic terminal according to any one of claim 1, wherein a center axis of the body portion and a center axis of the fixation portion are arranged in different directions.

12. The hermetic terminal according to any one of claim 1, wherein the fixation portion is arranged to be fixable to an external device at a position distanced from a center axis of the body portion.

13. A contact device in an electromagnetic relay for opening and closing the contact device with an electromagnet device, comprising at least:
- a metal container provided with a through hole;
- a pipe lead inserted through the through hole;
- an insulating material sealing the pipe lead and the metal container;
- a terminal block penetrating the pipe lead and secured to the pipe lead;
- a fixed contact supported on the terminal block;
- a lid covering and airtightly sealing a periphery of an opening of the metal container;
- a movable contactor supported on a shaft penetrating the lid; and
- a movable contact provided to the movable contactor,
- wherein the terminal block comprises at least a body portion and a head portion, the head portion further has a fixation portion, the fixation portion comprises a through hole for spiral fastening, and an axis of the fixation portion is not arranged coaxially with an axis of the body portion.

14. The contact device according to claim 13, wherein the terminal block is made of a low-resistance metal.

15. The contact device according to claim 13, wherein the terminal block is made of copper, aluminum or a copper-based alloy or an aluminum-based alloy.

16. The contact device according to any one of claim 13, wherein the insulating material is made of glass or epoxy resin.

17. The contact device according to any one of claim 13, wherein the head portion is provided on an outer side of the terminal block.

18. The contact device according to any one of claim 13, wherein the head portion is provided by extending the terminal block.

19. The contact device according to any one of claim 13, wherein the head portion is provided in a flat plate-shape.

20. The contact device according to any one of claim 13, characterized in that the head portion is bent at a predetermined angle.

21. The contact device according to any one of claim 13, wherein the fixation portion is formed by one or more of a through hole, a blind hole, a spiral hole or a spiral blind hole, a notch, a protrusion, and a convex portion.

22. The contact device according to any one of claim 13, wherein a center axis of the fixation portion is provided to be orthogonal to a center axis of the body portion.

23. The contact device according to any one of claim 13, wherein a center axis of the body portion and a center axis of the fixation portion are arranged in different directions.

24. The contact device according to any one of claim 13, wherein the fixation portion is arranged to be fixed to an external device at a position distanced from a center axis of the body portion.

* * * * *